(12) United States Patent
Lawler et al.

(10) Patent No.: US 11,267,300 B2
(45) Date of Patent: Mar. 8, 2022

(54) HITCH MECHANISM

(71) Applicant: DEERE & COMPANY, Moline, IL (US)

(72) Inventors: Richard J. Lawler, Dubuque, IA (US); Harshal Deore, Satana (IN); Syed Gouse Moiddin, Hyderabad (IN); Bryon P. Neumann, Brantford (CA); Akshay Kumar, Gaya (IN)

(73) Assignee: Deere & Company, Moline, IL (US)

( * ) Notice: Subject to any disclaimer, the term of this patent is extended or adjusted under 35 U.S.C. 154(b) by 330 days.

(21) Appl. No.: 16/453,174

(22) Filed: Jun. 26, 2019

(65) Prior Publication Data

US 2020/0406692 A1 Dec. 31, 2020

(51) Int. Cl.
| | |
|---|---|
| *A01G 23/00* | (2006.01) |
| *B60D 1/24* | (2006.01) |
| *B60D 1/48* | (2006.01) |
| *B60D 1/145* | (2006.01) |
| *A01B 59/06* | (2006.01) |

(Continued)

(52) U.S. Cl.
CPC ............ *B60D 1/246* (2013.01); *A01B 59/066* (2013.01); *A01B 76/00* (2013.01); *A01G 23/00* (2013.01); *B60D 1/145* (2013.01); *B60D 1/187* (2013.01); *B60D 1/485* (2013.01); *B62D 49/08* (2013.01); *B60D 1/44* (2013.01); *B60D 1/46* (2013.01); *B60D 2001/001* (2013.01); *E02F 9/0858* (2013.01)

(58) Field of Classification Search
CPC .. B60D 1/246; B60D 1/187; B60D 2001/001; B60D 1/44; B60D 1/46; A01B 76/00; A01B 59/066; B62D 49/08; A01G 23/00; A01G 23/006

USPC ........................................... 59/15.9; 172/439
See application file for complete search history.

(56) References Cited

U.S. PATENT DOCUMENTS

| | | | | | |
|---|---|---|---|---|---|
| 2,504,954 | A | * | 4/1950 | Allin | A01G 23/006 254/390 |
| 3,160,284 | A | * | 12/1964 | Moore | B62D 49/08 212/279 |

(Continued)

FOREIGN PATENT DOCUMENTS

| | | | | | |
|---|---|---|---|---|---|
| DE | 9403438 U1 | * | 6/1994 | | B60D 1/46 |
| DE | 102008044866 A1 | * | 3/2010 | | A01G 23/00 |

(Continued)

*Primary Examiner* — Jacob D Knutson
*Assistant Examiner* — Myles A Harris

(57) ABSTRACT

A hitch mechanism for a work vehicle configured for operation on slopes. The hitch mechanism couplable to a tether fixed in position up the slope. An arm extends outwardly and upwardly from the work vehicle frame and supports a tether engaging structure couplable to the tether. The arm is mounted to the frame structure beneath the body portion of the work vehicle and extends rearwardly from the frame to support the tether engaging structure rearwardly of the body portion and rearwardly of the ground engaging drive mechanism. The hitch includes a pivot structure coupling the arm to the frame that allows the arm to pivot about a horizontal axis such that the arm is shiftable vertically. A controller receives inputs corresponding to at least one vehicle parameter and is operatively coupled to an actuator for causing the arm to shift in response to changes in the vehicle parameter.

6 Claims, 7 Drawing Sheets

(51) Int. Cl.
*A01B 76/00* (2006.01)
*B60D 1/18* (2006.01)
*B62D 49/08* (2006.01)
*B60D 1/00* (2006.01)
*B60D 1/44* (2006.01)
*B60D 1/46* (2006.01)
*E02F 9/08* (2006.01)

(56) References Cited

U.S. PATENT DOCUMENTS

| | | | | |
|---|---|---|---|---|
| 3,332,181 | A * | 7/1967 | Carlson | A01G 23/006 52/117 |
| 3,430,790 | A * | 3/1969 | Beltrami | E02F 9/028 414/695 |
| 3,682,211 | A * | 8/1972 | Kantola | A01G 23/00 144/4.1 |
| 3,772,825 | A * | 11/1973 | Gagnon | A63H 17/14 446/425 |
| 3,850,304 | A * | 11/1974 | Howell | A01G 23/006 414/569 |
| 3,943,306 | A * | 3/1976 | Aihara | B60L 53/18 191/12.2 R |
| 4,108,264 | A * | 8/1978 | Tanaka | H02G 1/06 180/2.1 |
| 4,261,684 | A * | 4/1981 | Norton | B62D 49/065 280/478.1 |
| 4,278,392 | A * | 7/1981 | Meisel, Jr. | A01G 23/006 212/255 |
| 4,353,424 | A * | 10/1982 | Schenck | A01G 23/006 172/247 |
| 4,365,927 | A * | 12/1982 | Schenck | A01G 23/006 104/183 |
| 4,423,852 | A * | 1/1984 | Conroy | E21C 35/046 191/12 R |
| 4,529,350 | A * | 7/1985 | Jones | A01G 23/006 414/494 |
| 4,795,135 | A * | 1/1989 | Scott | A01G 23/006 180/14.4 |
| 4,872,700 | A * | 10/1989 | Mellgren | B60G 5/02 280/677 |
| 5,697,454 | A * | 12/1997 | Wilcox | A01B 59/068 172/439 |
| 5,816,339 | A * | 10/1998 | Parsons | A01B 71/066 172/449 |
| 6,250,396 | B1 * | 6/2001 | Gengler | A01B 59/0415 172/439 |
| 6,585,056 | B2 * | 7/2003 | Pellenc | A01B 39/166 172/133 |
| 7,600,574 | B2 * | 10/2009 | Chauvel | A01B 59/068 172/439 |
| D633,784 | S * | 3/2011 | Iwama | D8/395 |
| 9,342,091 | B2 * | 5/2016 | Wuisan | E02F 3/435 |
| 9,554,499 | B2 * | 1/2017 | Muller | A01B 59/042 |
| 9,622,399 | B2 * | 4/2017 | Kremmer | A01B 59/06 |
| 9,629,299 | B2 * | 4/2017 | Swanson | E02F 3/7631 |
| 9,773,175 | B2 * | 9/2017 | Friend | B60L 9/00 |
| 9,788,471 | B2 * | 10/2017 | Buttjer | A01B 59/068 |
| 9,809,249 | B2 * | 11/2017 | Boehm | B62D 11/00 |
| 10,448,556 | B2 * | 10/2019 | Gresch | A01B 69/008 |
| 10,759,325 | B1 * | 9/2020 | Polny | B60D 1/02 |
| 10,893,642 | B2 * | 1/2021 | Heckeroth | A01B 59/061 |
| 2007/0000673 | A1 * | 1/2007 | Farnsworth | A01B 59/066 172/439 |
| 2009/0157265 | A1 * | 6/2009 | Kim | A01G 23/00 701/50 |
| 2009/0294213 | A1 * | 12/2009 | Kim | E06C 5/08 182/127 |
| 2010/0013189 | A1 * | 1/2010 | Pollock | B60D 1/46 280/490.1 |
| 2011/0259258 | A1 * | 10/2011 | DePiero | G01D 21/00 116/200 |
| 2012/0205893 | A1 * | 8/2012 | Singh | A01B 63/145 280/405.1 |
| 2014/0096870 | A1 * | 4/2014 | Kaye | A01G 23/08 144/335 |
| 2017/0089797 | A1 * | 3/2017 | Lawler | A01G 23/081 |
| 2017/0254047 | A1 * | 9/2017 | Kortesalmi | E02F 3/32 |
| 2019/0168551 | A1 * | 6/2019 | Krume | B60P 3/41 |
| 2019/0327877 | A1 * | 10/2019 | Schibel | A01B 59/066 |
| 2019/0385461 | A1 * | 12/2019 | Blomstrand | B60D 1/46 |
| 2020/0324594 | A1 * | 10/2020 | Letscher | B60D 1/36 |
| 2020/0352116 | A1 * | 11/2020 | Alescio | B66D 1/005 |
| 2021/0122201 | A1 * | 4/2021 | Davis | B60D 1/40 |

FOREIGN PATENT DOCUMENTS

| | | | | |
|---|---|---|---|---|
| EP | 0275902 | A2 * | 7/1988 | A01G 23/006 |
| EP | 2992747 | B1 * | 11/2017 | |
| FR | 1092019 | A * | 4/1955 | B60D 1/46 |
| FR | 2069711 | A5 * | 9/1971 | A01G 23/006 |
| FR | 2527582 | A1 * | 12/1983 | A01G 23/006 |
| FR | 3088517 | A1 * | 5/2020 | A01B 59/066 |
| GB | 697344 | A * | 9/1953 | E02F 9/0858 |
| GB | 1121557 | A * | 7/1968 | A01B 59/066 |
| GB | 2132065 | A * | 7/1984 | A01D 67/005 |
| GB | 2398052 | A * | 8/2004 | B60D 1/167 |
| GB | 2571131 | A * | 8/2019 | A01B 59/004 |
| JP | 58043871 | A * | 3/1983 | A01G 23/006 |

* cited by examiner

HITCH MECHANISM

FIELD OF THE DISCLOSURE

This disclosure relates to work vehicles operable on slopes, and more particularly to forestry vehicles that operate on slopes in a forest, the forestry vehicles having a hitch for connection to a tether extending up the slope to help hold the vehicle in place on the slope.

BACKGROUND OF THE DISCLOSURE

In order to more securely hold a forestry vehicle in position on steep slopes, it is known to secure one end of a tether near the top of the slope and the other end of the tether to a hitch at the rear of the forestry vehicle. It is known to connect such tethers directly to the frame of the forestry vehicles between the vehicle's tracks or wheels, and beneath the body portion of the vehicle.

SUMMARY OF THE DISCLOSURE

In one embodiment, a hitch mechanism for a work vehicle is disclosed. The work vehicle includes a frame and ground engaging drive mechanism or tracks. The frame supports a body portion. The vehicle is adapted for use on slopes, and can be attached to a tether that is held securely in position at a location higher up the slope. The hitch mechanism includes an arm extending outwardly and upwardly from the frame and supporting a tether engaging structure that is couplable to the tether. The arm is mounted to the frame structure beneath the body portion of the work vehicle. The arm extends rearwardly from the frame to support the tether engaging structure rearwardly of the body portion and rearwardly of the ground engaging drive mechanism. The arm as shown includes a rearwardly extending portion and an upwardly extending portion. A pivot structure couples the arm to the frame, and allows the arm to pivot about a laterally extending axis such that the arm is shiftable vertically. The pivot structure shown also allows the arm to pivot about a vertical axis to allow the arm to shift laterally with respect to the vehicle. The pivot structure shown limits the lateral pivoting of the arm. An actuator, shown as a hydraulic cylinder, is operatively coupled to the arm for shifting the arm between positions. The arm extends rearwardly past a rearward-most portion of the body portion. The arm extends rearwardly to support the tether engaging structure rearwardly of a rearward-most portion of the ground engaging drive mechanism. A controller is coupled to the work vehicle, and is configured to receive inputs corresponding to at least one vehicle parameter. The controller causes the hydraulic cylinder to extend or retract in response to changes in the vehicle parameter. The vehicle parameter may be an angle of the work vehicle from a horizontal axis, such as the angle corresponding to the slope upon which the work vehicle is located. The parameter may also be the pivoted position of the body portion with respect to the frame. The parameter may also be the pitch of the body portion relative to the frame. Other parameters could also be provided.

Other features and aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

As used herein, unless otherwise limited or modified, lists with elements that are separated by conjunctive terms (e.g., "and") and that are also preceded by the phrase "at least one of" or "one or more of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

DETAILED DESCRIPTION

Figure 1:
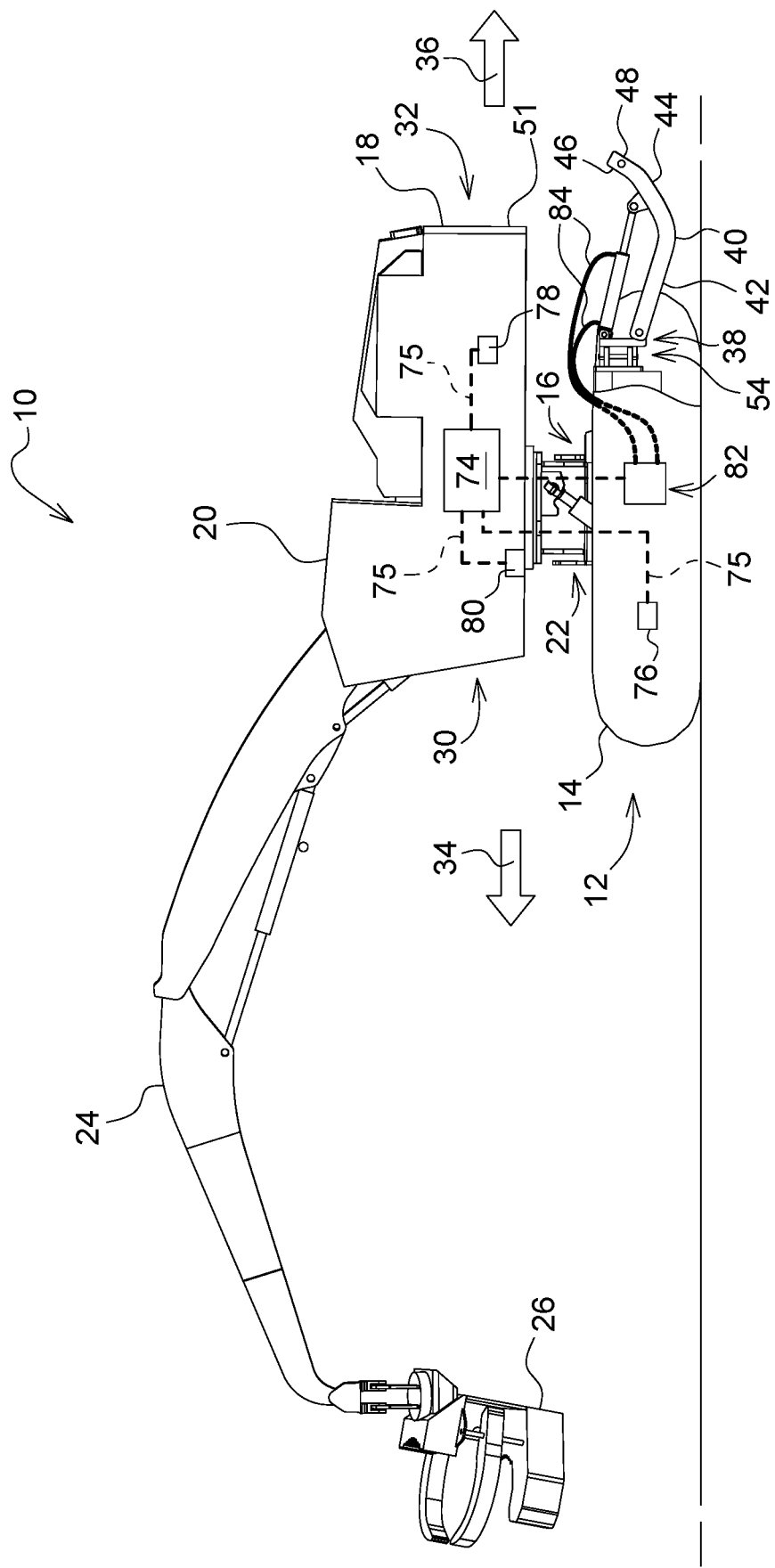
FIG. 1 is a cut-away view of a forestry vehicle with hitch mechanism according to one embodiment.
Figure 2:
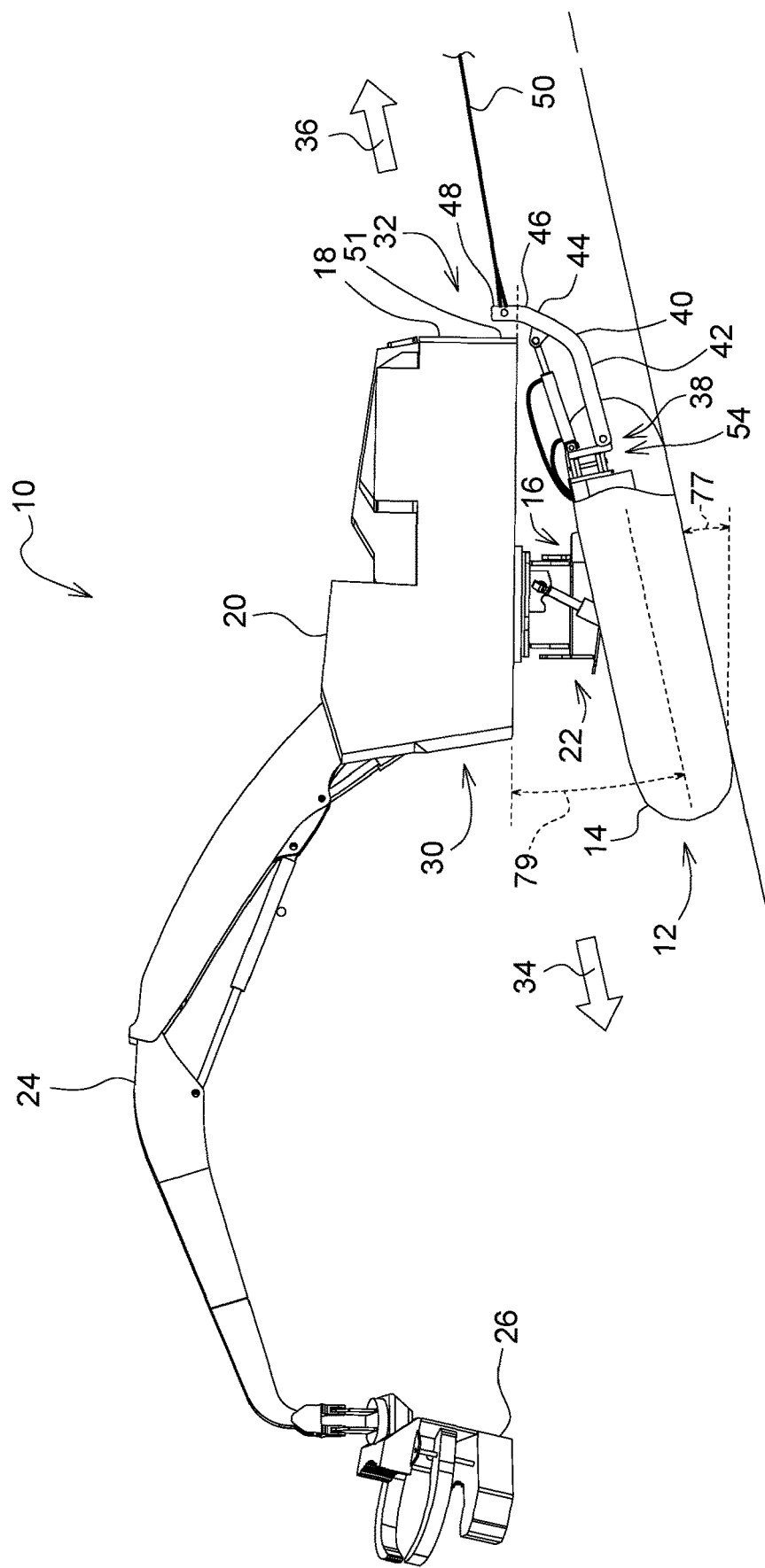
FIG. 2 is a cut-away view of the embodiment shown in FIG. 1 in operation on a slope or incline and with the hitch mechanism connected to a tether and in a raised position.
Figure 3:
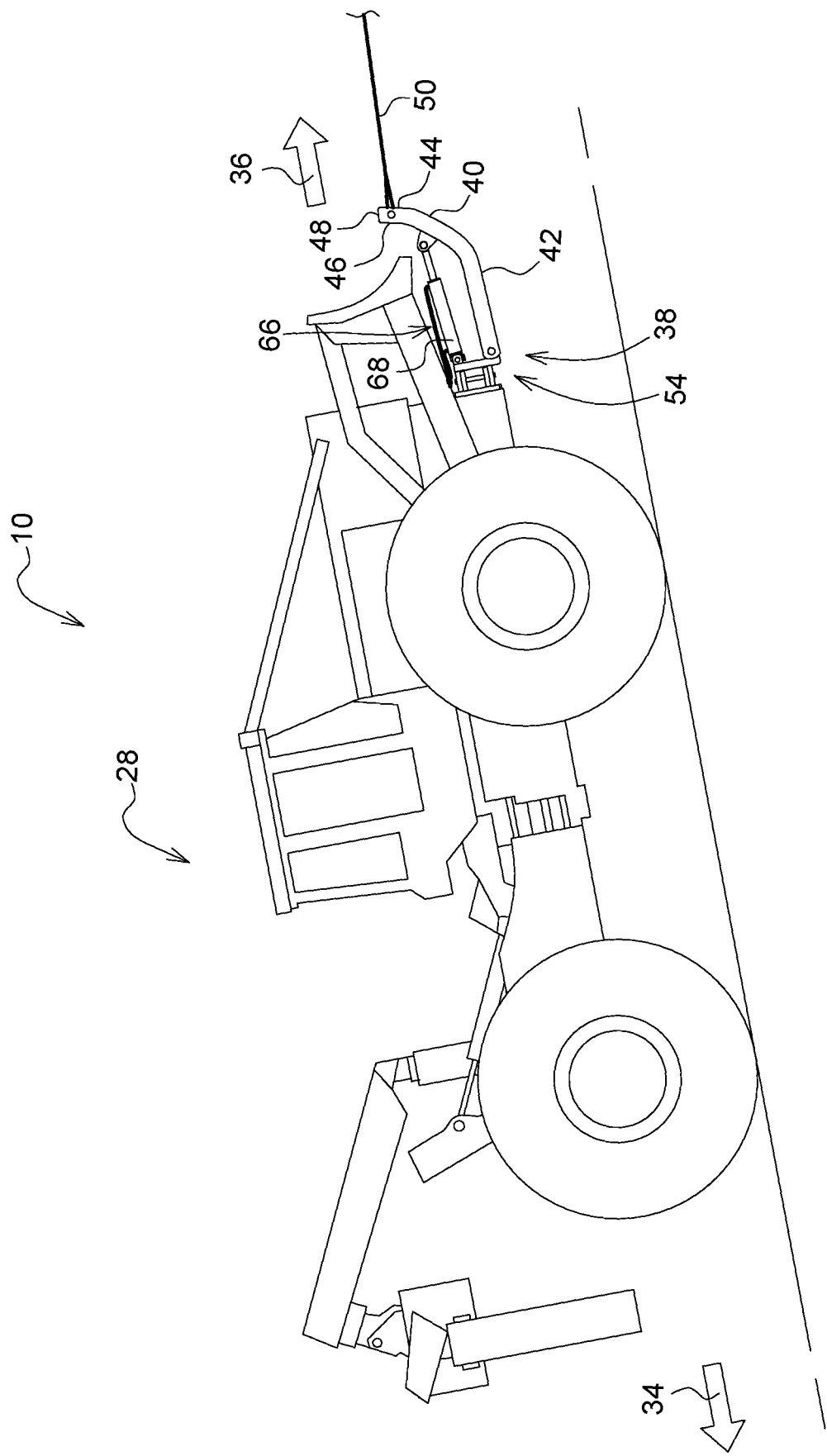
FIG. 3 is a view of an embodiment of the hitch mechanism coupled to a log skidder vehicle operating on a slope.

As seen in FIG. 1, a work vehicle 10 is shown having a ground engaging drive mechanism 12. The ground engaging drive mechanism 12 can be a set of tracks 14 as shown, or wheels. The tracks 14 are mounted to a frame portion 16 of the vehicle 10, which supports a body portion 18 of the vehicle 10. The body portion 18 may include a cab 20 within which an operator can be seated during operation. Carried by the frame 16 is a support structure 22 which carries the body portion 18 such that the body portion 18 can pivot about a vertical axis with respect to the frame 16. The support structure 22 also allows the body portion 18 to pitch with respect to the frame 16, as seen in FIG. 2, thereby allowing the body 18 to remain closer to a horizontal orientation during operation on sloped surfaces. The work vehicle 10 shown in FIG. 1 is a forestry machine having a forwardly extending boom arm 24 upon which is mounted a forestry head or tool 26. The head 26 is adapted to engage trees for cutting and gathering the trees. The work vehicle 10 could also be a different type of vehicle, such as a grapple skidder 28, as shown in FIG. 3. The work vehicle 10 is shown in FIG. 1 on a level surface and has a front portion 30 and a rear portion 32. For purposes of this description, the forward direction 34 is the direction the operator faces during work operations, which is downhill in these views. The rearward direction 36 as shown is the uphill direction to the rear of the vehicle 10 during normal work operations on a wooded slope.

Figure 4:
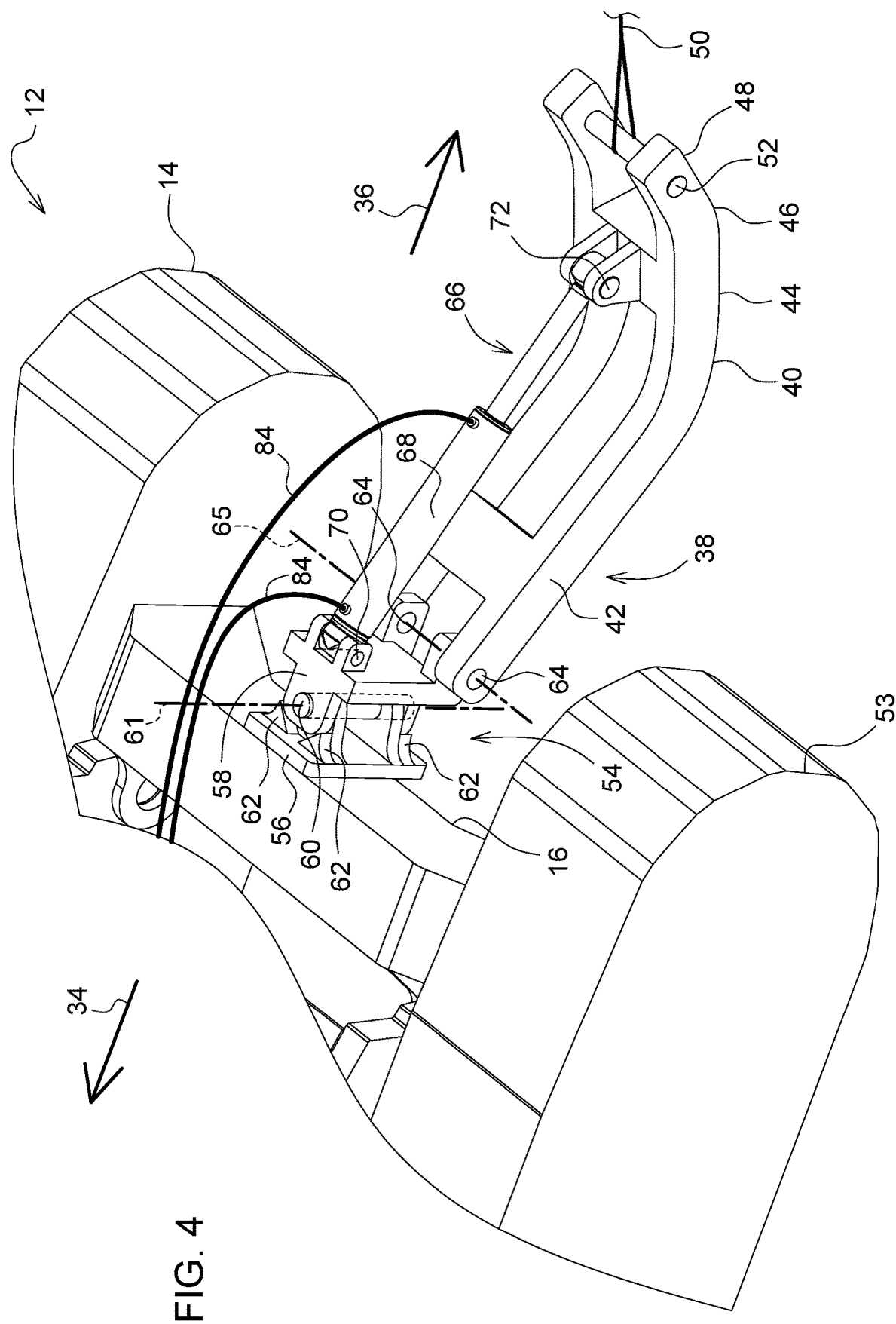
FIG. 4 is a view of an embodiment of the hitch mechanism in a first position.
Figure 5:
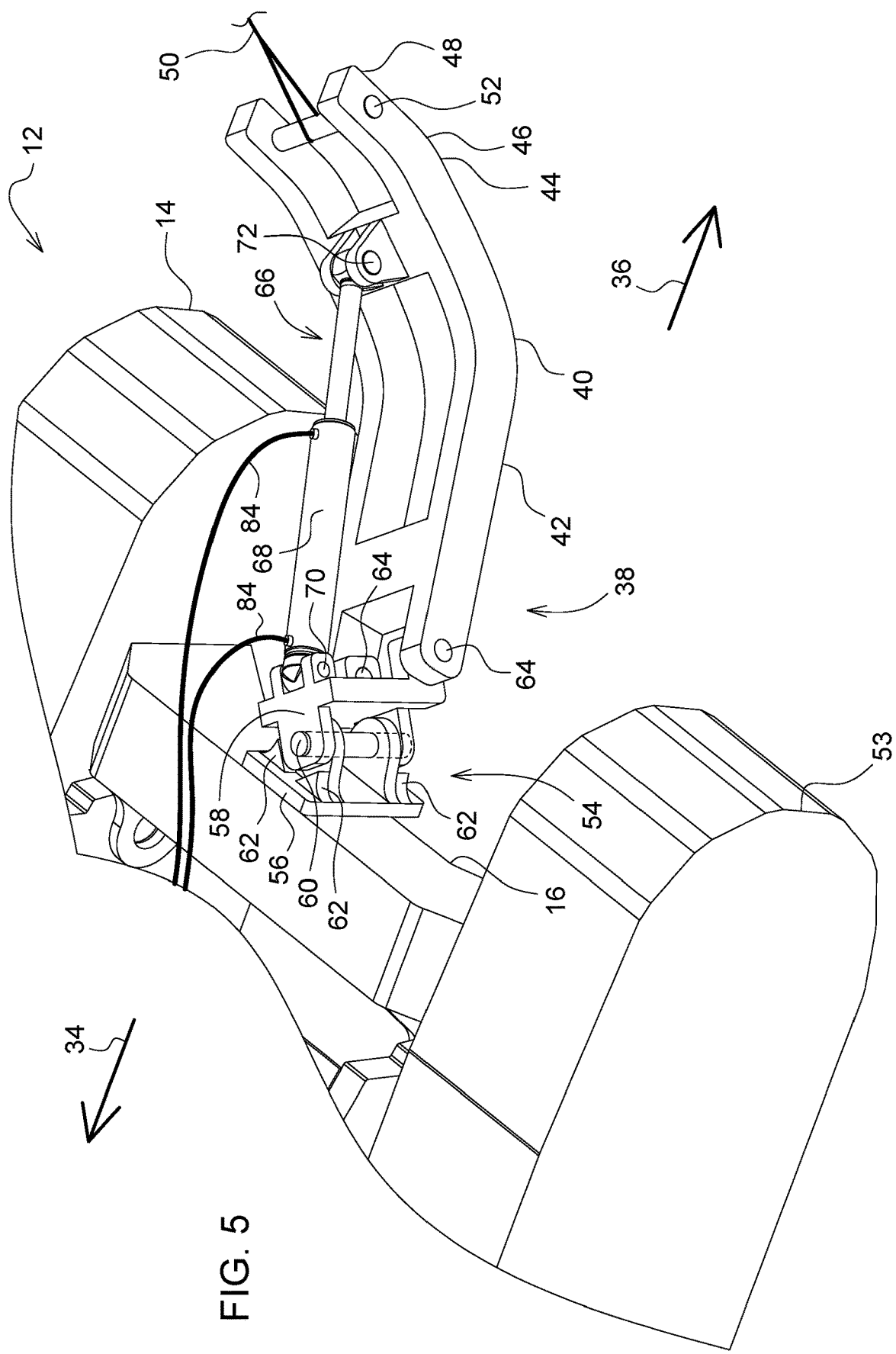
FIG. 5 is a view of the hitch mechanism of FIG. 4 in a second position.
Figure 6:
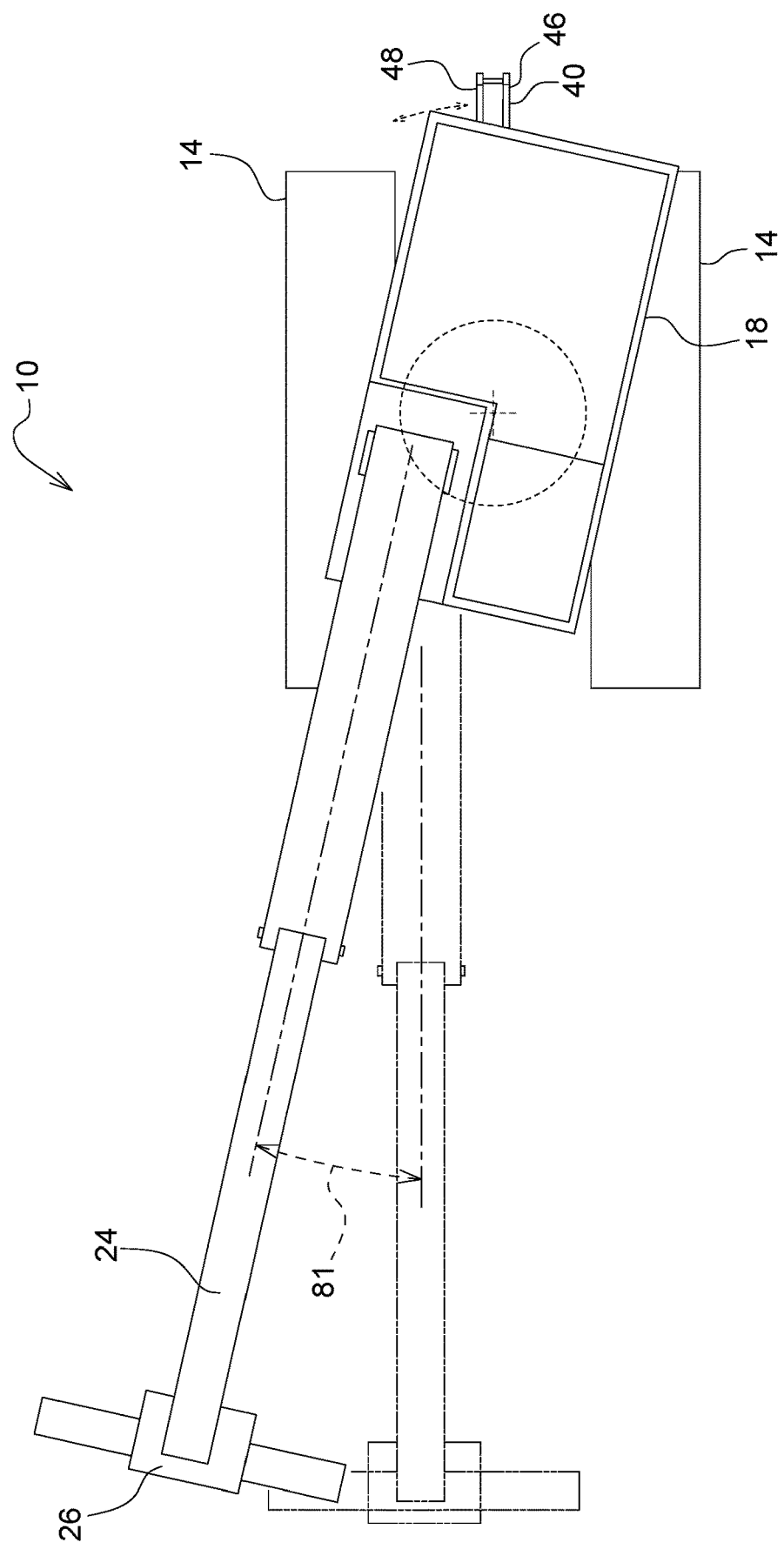
FIG. 6 is a view of the vehicle of FIG. 1, showing the boom arm and body pivoted with respect to the vehicle's frame and tracks.

As seen in FIG. 2, the work vehicle 10 is adapted for operation on sloped surfaces, such as hillsides where trees are to be harvested. A hitch mechanism 38 according to one embodiment is shown on the rear 32 of the vehicle 10. The hitch mechanism 38, which is also shown in more detail in FIGS. 4 and 5, includes an arm 40 extending rearwardly 36 and upwardly from the vehicle frame 16. The arm 40 includes a rearwardly extending portion 42 and an upwardly extending portion 44. The rearward-most or outer end 46 of the arm 40 supports a tether engaging portion 48 to which can be coupled a tether 50 that extends up the slope. The tether 50 can be a chain, cable, rope or other appropriate material. The tether engaging portion 48 as shown includes a pin 52 supported near the end portion 46 of the arm 40. The tether 50 is held securely in position at a fixed location at a point higher up on the slope. Hitching the tether 50 to the work vehicle 10 can provide added stability to the work vehicle 10 and helps secure or maintain the work vehicle 10 in position on the slope during work operations. The arm 40 is mounted to the frame 16 between the two tracks 14 by way of a pivot structure 54, as best seen in FIGS. 4 and 5. The pivot structure 54 includes first and second members 56, 58 held together by a pin 60 having a generally vertical axis 61, which allows the arm 40 to pivot side to side. The arm 40 as shown is allowed to pivot freely from side to side during operation. The first member 56 includes stops 62 that contact the second member 58 to limit lateral pivoting of the arm 40 during operation. The arm 40 as shown is mounted to the second member 58 of the pivot structure 54 via pin members 64 having common, generally horizontal axes 65. The pins 64 allow the arm 40 to pivot vertically. An actuator 66 is shown in engagement with the arm 40. The actuator 66 as shown engages the arm 40 via a pin member 72 and is supported by the pivot structure 54 by a pin member 70. The actuator 66 as shown is a hydraulic cylinder 68, however other types of actuators could also be provided (e.g., electric). The actuator 66 can be extended or retracted to alter the position of the arm 40 and pivot the arm 40 up or down about the axis defined by the pin members 64. The travel of the hydraulic cylinder 68 limits the vertical pivoting of the arm 40 during operation.

A controller 74 can be provided as shown in FIG. 1. The controller 74 is an electronic device that receives inputs corresponding to at least one vehicle parameter 75 and sends output signals to a hydraulic system 82 that causes the actuator 66 to extend or retract. The vehicle 10 can be provided with incline sensors 76 that measure the incline angle 77 of the tracks 14, which correspond to the slope of the ground upon which the vehicle 10 is working. Pitch sensors 78 can also be provided that measure the angle of pitch 79 between the body portion 18 and the frame 16. Position sensors 80 can be provided to measure a pivoted position 81 of the body portion 18 as it pivots laterally with respect to the frame 16.

The vehicle parameter 75 can be the incline angle 77 of the tracks 14, the pitch 79 of the body portion 18 relative to the frame 16, the pivoted position 81 of the body 18 with respect to the frame 16, the weight of the trees being supported by the forestry head, and/or other vehicle parameters 75. The controller 74 as shown receives inputs corresponding to the vehicle parameter 75, and then adjusts the actuator 66 as the vehicle parameters 75 change. The controller 74 may cause the actuator 66 to shift the arm 40 horizontally and/or vertically in response to changes in the incline angle 77, angle of pitch 79, and pivoted position 81 of the body portion. The hydraulic system 82 operatively engages the hydraulic cylinder 68 via hydraulic lines 84 for extending and retracting the hydraulic cylinder 68. The controller 74 is operatively coupled with the hydraulic system 82 to shift the hydraulic cylinder 68, thereby changing the position of the arm 40.

Without in any way limiting the scope, interpretation, or application of the claims appearing below, a technical effect of one or more of the example embodiments disclosed herein is described below. The work vehicle 10 is adapted for operation on a sloped surface, such as a wooded hillside. The tether 50 helps maintain the work vehicle 10 in position on the slope. The arm 40 extends rearwardly 36 and upwardly from the frame 16. The arm 40 supports the tether engaging structure 48 at a relatively high point above the ground. This can increase the stability of the work vehicle 10 on the slope. By raising the connection point of the vehicle 10 to the tether 50, the tether 50 extends at an angle to the slope and establishes a greater vertical downforce to the work vehicle 10 from the tether 50. The high connection point established by the embodiment shown helps to counteract the forces that might cause the work vehicle 10 to pivot or tilt in the forward direction down the slope.

Figure 7:
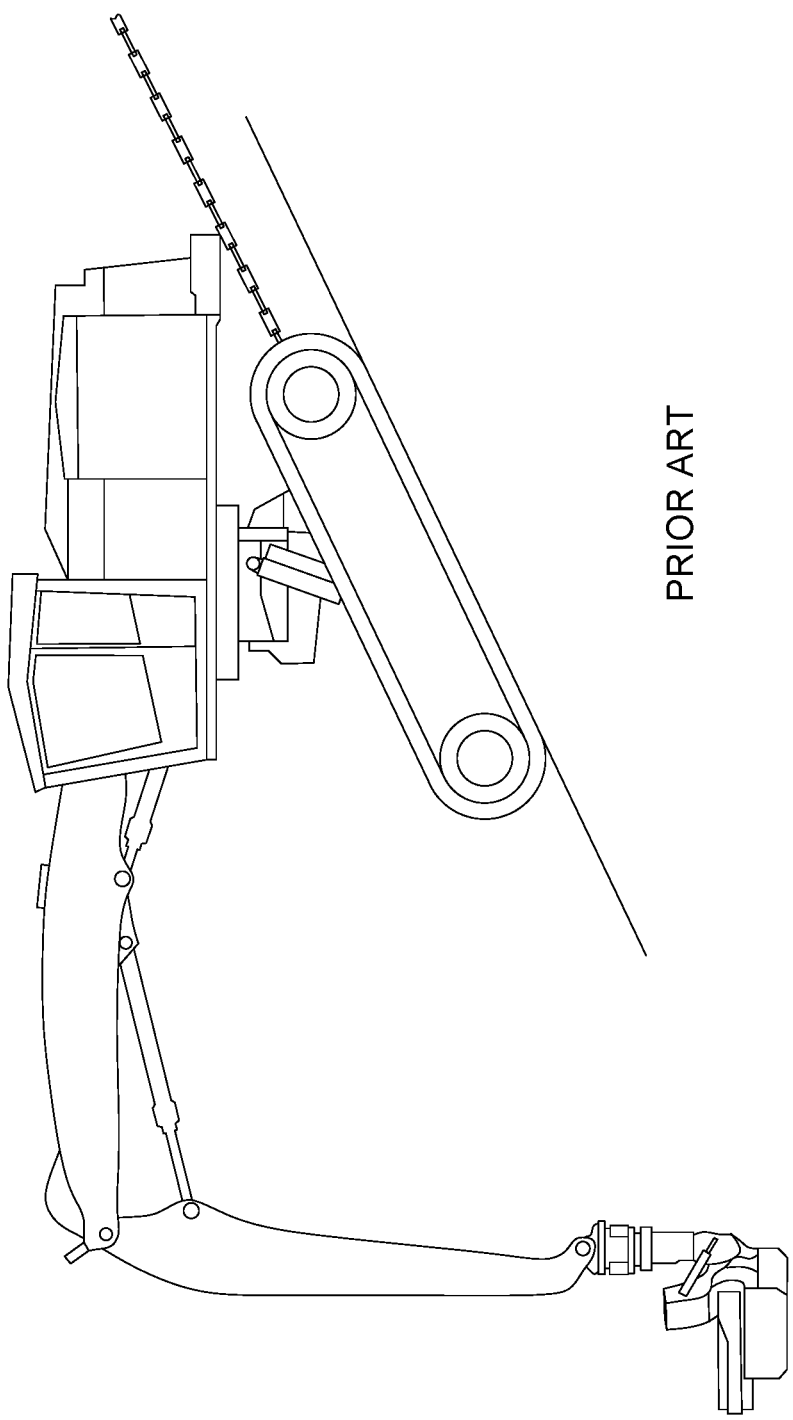
FIG. 7 is a view of a prior art work vehicle in operation on a slope with a chain or tether in contact with the body portion of the work vehicle.

A work vehicle 10 with a conventional hitch to which a tether 50 is connected is shown in operation on a slope in FIG. 7. The body portion 18 of the vehicle 10 is pivoted or pitched from the angle of the tracks 14 to maintain the body portion 18 close to a horizontal orientation, which keeps the cab 20 and operator in a more upright position. In this configuration, the tether 50 can contact the rear of the body portion 18, as shown.

Referring now to FIGS. 1-5, the arm 40 according to one embodiment of the present invention extends rearwardly 36 to support the tether engaging structure 48 rearwardly of a rearward-most portion 51 of the body portion 18. This precludes the tether 50 from rubbing on the rear of the body portion 18. The shape of the arm 40 shown, with one segment, the rearwardly extending portion 42, extending rearwardly and another segment, the upwardly extending portion 44, extending upwardly, facilitates establishing a high connection point with the tether 50 clear of the body portion 18. The arm 40 shown establishes a connection point higher than the rearward-most portion 51 of the body portion 18. The hitch mechanism 38 establishes a connection point with the tether 50 that is generally higher than it would be if the tether 50 were to be coupled directly to the frame 16. The relatively high location of the tether engaging structure 48 as shown serves to increase the stability of the work vehicle 10 on slopes and serves to better counteract forces acting on the vehicle 10 associated with operation on a slope.

The arm 40 supports the tether engaging structure 48 rearwardly of the rearward-most ground engaging drive portion 53 of the tracks 14. This prevents the tether 50 from contacting the tracks 14, which could damage the tracks 14 or the tether 50. The stops 62 prevent the arm 40 from swinging laterally into contact with the tracks 14, thereby preventing damage to the arm 40 or tracks 14.

As the work vehicle 10 moves to different locations on the slope, and as the forestry head 26 operates to harvest trees at the front 30 of the work vehicle 10, the tether 50 may shift within a range of taught and slack modes. As the tether 50 changes between taught and slack modes, the tether 50 can impart forces to the work vehicle 10 through the arm 40 and pivot structure 54. The actuator 66, which is shown in the drawings as a hydraulic cylinder 68, can act as a damper as these forces are encountered. This can help reduce jarring motions on the operator and can help reduce wear and tear on the work vehicle 10, the hitch mechanism 38, and the tether 50.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all the features described yet still benefit from at least some of the advantages of such features. Those of ordinary skill in the art may devise their own implementations that incorporate one or more of the features of the present disclosure and fall within the spirit and scope of the appended claims. Having described the preferred embodiment, it will become apparent that various modifications can be made without departing from the scope of the invention as defined in the accompanying claims.

What is claimed is:

1. A hitch mechanism for a work vehicle, the work vehicle having a frame and a ground engaging drive mechanism configured for operation on slopes, the hitch mechanism being couplable to a tether supported at a tether position up the slope from the work vehicle to help secure the work vehicle on the slope, the hitch mechanism comprising:
   an arm extending outwardly and upwardly from the frame;
   a tether engaging structure that is coupled to the arm and couplable to the tether; a pivot structure that couples the arm to the frame, the pivot structure allowing the arm to pivot about a horizontal axis such that the arm is shiftable vertically;
   an actuator operatively coupled to the arm for shifting the arm; and
   a controller coupled to the work vehicle, the controller configured to receive inputs corresponding to a vehicle parameter, the controller causing the arm to shift in response to changes in the vehicle parameter, the controller causing the actuator to shift the arm vertically as the inputs change; wherein the vehicle parameter is an incline angle of the work vehicle from a horizontal axis, the incline angle corresponding to the slope upon which the work vehicle is located.

2. A hitch mechanism for a work vehicle, the work vehicle having a frame and a ground engaging drive mechanism configured for operation on slopes, the hitch mechanism being couplable to a tether supported at a tether position up the slope from the work vehicle to help secure the work vehicle on the slope, the hitch mechanism comprising:
   an arm extending outwardly and upwardly from the frame;
   a tether engaging structure that is coupled to the arm and couplable to the tether; a pivot structure that couples the arm to the frame, the pivot structure allowing the arm to pivot about a horizontal axis such that the arm is shiftable vertically;
   an actuator operatively coupled to the arm for shifting the arm; and
   a controller coupled to the work vehicle, the controller configured to receive inputs corresponding to a vehicle parameter, the controller causing the arm to shift in response to changes in the vehicle parameter, the controller causing the actuator to shift the arm vertically as the inputs change; wherein the work vehicle includes a body portion pivotably coupled to the frame, and the vehicle parameter is a pivoted position of the body portion with respect to the frame, and the controller causes the actuator to shift the arm vertically in response to changes in the pivoted position of the body portion.

3. A hitch mechanism for a work vehicle, the work vehicle having a frame and a ground engaging drive mechanism configured for operation on slopes, the hitch mechanism being couplable to a tether supported at a tether position up the slope from the work vehicle to help secure the work vehicle on the slope, the hitch mechanism comprising:
   an arm extending outwardly and upwardly from the frame;
   a tether engaging structure that is coupled to the arm and couplable to the tether;
   a pivot structure that couples the arm to the frame, the pivot structure allowing the arm to pivot about a horizontal axis such that the arm is shiftable vertically;
   an actuator operatively coupled to the arm for shifting the arm; and
   a controller coupled to the work vehicle, the controller configured to receive inputs corresponding to a vehicle parameter, the controller causing the arm to shift in response to changes in the vehicle parameter, the controller causing the actuator to shift the arm vertically as the inputs change; wherein the work vehicle comprises a body portion coupled to the frame, the body portion configured to pitch with respect to the frame, and the vehicle parameter is the amount of pitch of the body portion with respect to the frame, and the controller causes the actuator to shift the arm vertically in response to changes in the pitch of the body portion with respect to the frame.

4. A hitch mechanism for a work vehicle, the work vehicle having a frame, a body portion supported by the frame, and a ground engaging drive mechanism supporting the frame, the work vehicle is configured for operation on slopes, the hitch mechanism being couplable to a tether supported at a tether position up the slope from the work vehicle to help secure the work vehicle on the slope, the hitch mechanism comprising:
   an arm extending outwardly and upwardly from the frame and supporting a tether engaging structure that is couplable to the tether, the arm is coupled to the frame structure beneath the body portion of the work vehicle and the arm extends rearwardly from the frame to support the tether engaging structure rearwardly of the body portion and rearwardly of the ground engaging drive mechanism;
   a pivot structure that couples the arm to the frame, the pivot structure allowing the arm to pivot about a horizontal axis such that the arm is shiftable vertically;
   an actuator coupled to the arm for shifting the arm;
   a controller coupled to the work vehicle, the controller is configured to receive inputs corresponding to a vehicle parameter and the controller causing the arm to shift in response to changes in the vehicle parameter, the controller causing the actuator to shift the arm vertically as the inputs change, wherein the vehicle parameter is an incline angle of the work vehicle from a horizontal axis, the angle corresponding to the slope upon which the work vehicle is located.

5. A hitch mechanism for a work vehicle, the work vehicle having a frame, a body portion supported by the frame, and a ground engaging drive mechanism supporting the frame, the work vehicle is configured for operation on slopes, the hitch mechanism being couplable to a tether supported at a tether position up the slope from the work vehicle to help secure the work vehicle on the slope, the hitch mechanism comprising:
- an arm extending outwardly and upwardly from the frame and supporting a tether engaging structure that is couplable to the tether, the arm is coupled to the frame structure beneath the body portion of the work vehicle and the arm extends rearwardly from the frame to support the tether engaging structure rearwardly of the body portion and rearwardly of the ground engaging drive mechanism;
- a pivot structure that couples the arm to the frame, the pivot structure allowing the arm to pivot about a horizontal axis such that the arm is shiftable vertically;
- an actuator coupled to the arm for shifting the arm;
- a controller coupled to the work vehicle, the controller is configured to receive inputs corresponding to a vehicle parameter and the controller causing the arm to shift in response to changes in the vehicle parameter, the controller causing the actuator to shift the arm vertically as the inputs change, wherein the body portion is pivotably coupled to the frame, and the vehicle parameter is a pivoted position of the body portion with respect to the frame, and the controller causes the actuator to shift the arm vertically in response to changes in the pivoted position of the body portion.

6. A hitch mechanism for a work vehicle, the work vehicle having a frame, a body portion supported by the frame, and a ground engaging drive mechanism supporting the frame, the work vehicle is configured for operation on slopes, the hitch mechanism being couplable to a tether supported at a tether position up the slope from the work vehicle to help secure the work vehicle on the slope, the hitch mechanism comprising:
- an arm extending outwardly and upwardly from the frame and supporting a tether engaging structure that is couplable to the tether, the arm is coupled to the frame structure beneath the body portion of the work vehicle and the arm extends rearwardly from the frame to support the tether engaging structure rearwardly of the body portion and rearwardly of the ground engaging drive mechanism;
- a pivot structure that couples the arm to the frame, the pivot structure allowing the arm to pivot about a horizontal axis such that the arm is shiftable vertically;
- an actuator coupled to the arm for shifting the arm;
- a controller coupled to the work vehicle, the controller is configured to receive inputs corresponding to a vehicle parameter and the controller causing the arm to shift in response to changes in the vehicle parameter, the controller causing the actuator to shift the arm vertically as the inputs change, wherein the body portion is configured to pitch with respect to the frame, and the vehicle parameter is the amount of pitch of the body portion with respect to the frame, and the controller causes the actuator to shift the arm vertically in response to changes in the pitch of the body portion with respect to the frame.

* * * * *